United States Patent [19]

Struthers

[11] Patent Number: 4,477,539
[45] Date of Patent: Oct. 16, 1984

[54] METAL/GAS FUEL CELL

[76] Inventor: Ralph C. Struthers, 39503 Calle El Fuente, Saugus, Calif. 91350

[21] Appl. No.: 458,835

[22] Filed: Jan. 18, 1983

[51] Int. Cl.³ .......................................... H01M 120/6
[52] U.S. Cl. ...................................... 429/19; 429/27; 429/34
[58] Field of Search ...................... 429/19, 17, 27, 34, 429/28, 29, 70, 72, 14, 15

[56] References Cited

U.S. PATENT DOCUMENTS

| | | | |
|---|---|---|---|
| 3,092,516 | 6/1963 | Rightmire | 429/34 X |
| 3,284,239 | 11/1966 | Hunger et al. | 429/12 |
| 3,527,618 | 9/1970 | Bushnell | 429/12 |
| 3,544,374 | 12/1970 | D'Alessandro et al. | 429/19 X |
| 4,317,863 | 3/1982 | Struthers | 429/19 |
| 4,348,465 | 9/1982 | Struthers | 429/27 |

*Primary Examiner*—Anthony Skapars

[57] ABSTRACT

A metal/gas fuel cell comprising an anode chamber filled with a base anolyte solution, a metallic anode plate immersed in the anolyte; an ion exchange chamber filled with a base ionolyte solution adjacent the anode chamber; a cationic membrane between the anode and ion exchange chambers separating the anolyte and ionolyte; a cathode plate adjacent the ion exchange chamber remote from the cationic membrane with one surface in contact with the ionolyte and another surface in contact with a cathode fuel gas. The cathode plate is a laminated structure including a layer of hydrophyllic material in contact with the ionolyte, a layer of gas permeable hydrophobic material in contact with the gas and a gas and liquid permeable current collector of inert material with catalytic surfaces within the layer of hydrophyllic material. The anode and cathode plates are connected with an external electric circuit which effects the flow of electrons from the anode plate to the cathode plate.

22 Claims, 14 Drawing Figures

Fig. 9.

METAL-AIR (O₂) FUEL CELL $$\text{ANODE: } Al + 3Na^+ + 4OH^- \rightarrow Al(OH)_3\downarrow + OH^- + 3Na^+ + 3e^-$$

$$\text{ION EXCH.:} \quad 3NaOH \leftarrow 3OH^- + 3Na^+$$

$$\frac{3}{2}H_2O$$

$$\text{CATHODE:} \quad 3OH^- \leftarrow \frac{3}{4}O_2 + \frac{3}{2}H_2O + 3e^-$$

$$\text{AIR} \rightarrow \frac{3}{4}O_2 \rightarrow \text{EXHAUST}$$

$$\text{NET CELL: } Al + \frac{3}{2}H_2O + \frac{3}{4}O_2 \rightarrow Al(OH)_3$$

METAL/GAS FUEL CELL

This invention has to do with fuel cells and is particularly concerned with a novel metal-gas fuel cell.

BACKGROUND OF THE INVENTION

In the art of electrochemical fuel cells, the chemical reactions between a single electrolyte and its related anode and cathode are different and are such that most effective and desired reaction, at both the anode and cathode, is unattainable. Accordingly, in most instances, the electrolytes for fuel cells are formulated to attain a compromise of chemical reaction as between the anodes and cathodes of the cells. For example, in fuel cells with aluminum anodes, to eliminate or reduce excessive corrosion of the aluminum and the formation of undesirable quantities of hydrogen gas and yet efficiently utilize the aluminum anode, the electrolytes are compounded with corrosion inhibitors to reduce corrosion of the aluminum to acceptable levels. With few exceptions, electrolytes which effectively attain the foregoing end are ineffective to establish and maintain most effective and efficient reaction at the cathodes of the cells. It has been determined that the above noted problem can be effectively eliminated by a fuel cell structure in which two different, but compatible, electrolytes are used. That is, a cell structure in which one electrolyte is provided to react with the anode and another which is provided to react with the cathode, whereby most effective and efficient reactions are attained at both the anode and cathode. It has been further determined that the effective use of two different electrolytes to attain the above noted end can be effected by establishing a cell structure with a cationic membrane in spaced relationship between the anode and the cathode and which establishes a fluid barrier between dissimilar anode and cathode electrolytes within the cell.

The ability to effectively use two different electrolytes in fuel cells, in the manner noted above, materially increases the range of materials that can be used as anode and cathode fuels and oftentimes notably increases the effectiveness and the efficient use of such fuels or materials. In particular, the use of certain gases, as cathode fuels, which heretofore could not be effectively and efficiently used as cathode fuels in fuel cells is made possible and highly practical.

OBJECTS AND FEATURES OF THE INVENTION

An object and feature of my invention is provide a novel fuel cell having a metal anode electrode, a gas cathode electrode, dissimilar anode and cathode electrolytes related to the anode and cathode electrodes and a cationic membrane establishing a liquid barrier between the dissimilar electrolytes and through which positive ions can freely move from one electrolyte to the other and from the anode to the cathode.

Another object and feature of my invention is to provide a novel fuel cell structure in which the anode electrode is a replaceable consumable element or part which can be easily and quickly removed and replaced by the new anode electrode when circumstances require and so that the useful life of the other elements and parts of the cell are unaffected by consumption of the anode electrode.

It is another object and feature of my invention to provide a fuel cell of the general character referred to including novel means for handling the anode and cathode electrolytes and the byproduct gases of fuel cell reaction.

Another object and feature of my invention is to provide a fuel cell which is particularly suitable for using ambient air as the cathode fuel and a cell which can effectively handle any one of a number of different gases which are suitable for use as cathode fuel in fuel cells.

Finally, it is an object and feature of my invention to provide a fuel cell structure which is such that it can be easily and quickly put into and taken out of service by replacement of one of the electrolytes with a dielectric liquid and a cell including novel means for handling that one electrolyte and the dielectric liquid and which is operable to selectively move the two liquids into and out of the fuel cell, as circumstances require. The foregoing and other objects and features of my invention will be fully understood from the following detailed description of typical forms and applications of the invention, , throughout which description reference is made to the accompanying drawings.

DETAILED DESCRIPTION OF THE INVENTION

Figure 1:
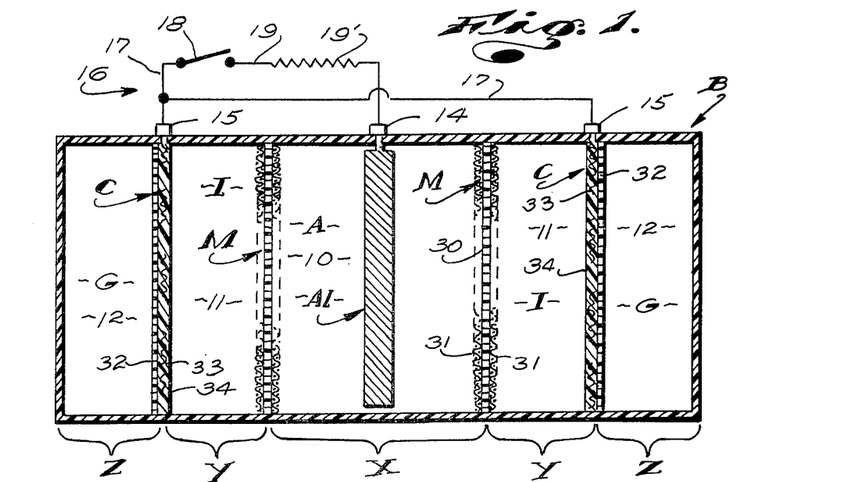
FIG. 1 is a diagrammatic view of my fuel cell.

In FIG. 1 of the drawings, I have diagrammatically illustrated my new fuel cell B. The fuel cell B is an elongate sectional structure with left and right-hand ends. The cell B includes a central anode section X, a pair of intermediate ion exchange sections Y (one at each end of the section X) and a pair of outer, left and right-hand cathode sections longitudinally outward of the sections Y. The central anode section X includes a chamber M filled with a liquid anode electrolyte or anolyte A and in which a flat, vertical anode plate AL is immersed. The pair of intermediate ion sections Y, occurring longitudinally outward of and adjacent the opposite ends of the central anode section X, define chambers 11, separated from the chamber 10 by flat cationic membranes M. The chambers 11 are filled with a liquid electrolyte or ionolyte I. The longitudinally inwardly and outwardly disposed surfaces of the membranes M are wetted by the anolyte A and the ionolyte I. The pair of cathode sections Z occur longitudinally outward of the sections Y and include cathode plates C at the outer ends of the sections Y. The inner surfaces of the cathode plates C are in contact with and wetted by the ionolyte I in the chambers 11. The cathode sections Z further include gas chambers 12 outward of the cathode plate and in and through which gas G is conducted to contact the outer surfaces of the cathode plates C.

It is to be noted that the chambers 12 of the cathode sections Z are such that any desired and suitable gas G can be used in operating my new cell. The gases G can be supplied to the chambers 12 from cylinders of compressed gas or from suitable gas generating means, as desired or as circumstances require. It is to be further noted that if the gas G used as the cathode fuel is oxygen from the ambient air, that structure which otherwise establishes the chambers 12 can be eliminated. In such a case, the ambient space about the cell is the full mechanical equivalent of and can be said to establish the referred to chambers 12.

In addition to the foregoing, the fuel cell B is shown as including terminal posts 14 and 15 on the anode and cathode plates AL and C. The posts 14 and 15 are accessible at the exterior of the fuel cell B and connect with a suitable electric circuit 16 which provides for the flow of electrons from the anode section X to the cathode sections Z during fuel cell operation. The circuit 16 is shown as including lines 17 extending from the posts 15 to one side of a switch 18. The other side of the switch 18 is connected with the post 14 by a line 19 in which a suitable load 19' is connected. The circuit 16 illustrated and described above is only an example of one basic form of circuit that might be used in carrying out my invention.

Figures 2, 3, 4:
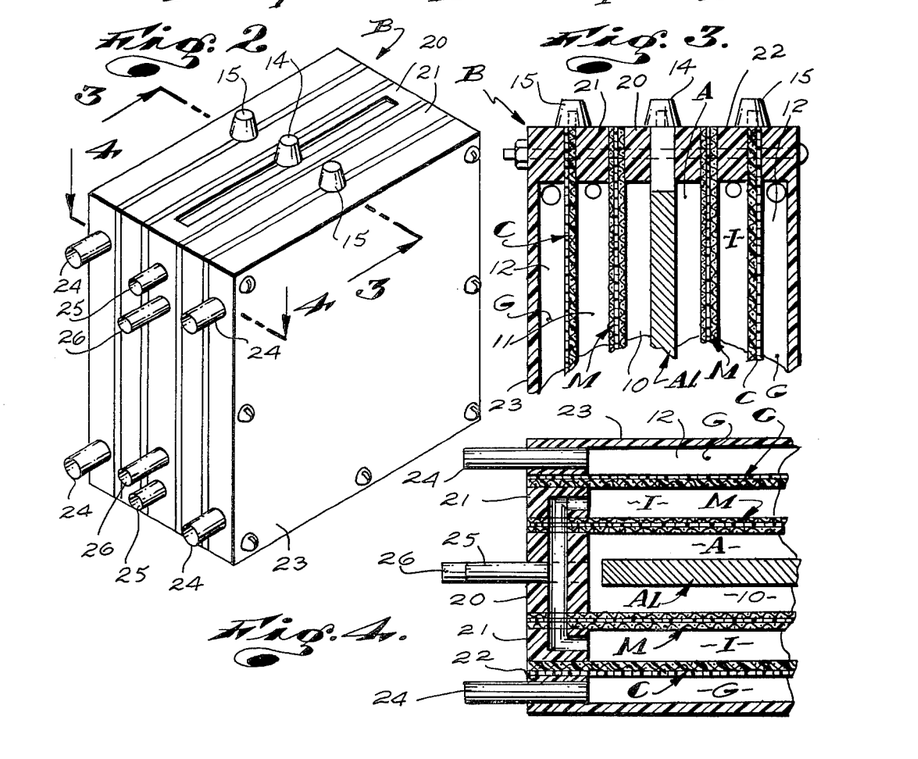
FIG. 2 is an isometric view of a preferred embodiment of my fuel cell.
FIG. 3 is an enlarged detailed sectional view taken as indicated by line 3—3 on FIG. 2.
FIG. 4 is an enlarged detailed sectional view taken substantially as indicated by line 4—4 on FIG. 2.

Referring to FIGS. 2, 3 and 4 of the drawings, I have shown certain structural details which have been effectively used in actual reductions to practice of my invention. Since the structural details shown in FIGS. 2, 3 and 4 are only examples of the structure that can be effectively used, I will not unduly burden this disclosure with full detailed description thereof. In the following, certain desired and necessary features of the structure illustrated will be noted.

It is to be noted that the cell structure illustrated is a stacked assembly of parts held in assembled relationship by a plurality of through bolt assemblies. The perimeter of the chamber 10 of the central anode section X is defined by a rectangular frame unit 20 with top, bottom and side walls. The top wall of the unit 20 has a slot opening in and through which the anode plate AL can be slidably engaged. The perimeter edges of the cationic membranes M overlie the opposite ends of the frame unit 20 and are held in tight, clamped and sealed engagement therewith by rectangular frame units 21 positioned longitudinally outward from the unit 20 and the membranes M and which define the perimeters of the chambers 11 of the ion exchange sections Y of the fuel cell. The perimeter edges of the cathode plates C overlie the outwardly disposed ends of the frame units 21 and are held in tight, clamped and sealed engagement therewith by rectangular frame units 22 positioned longitudinally outward of the plates C. The frame units 22 have outer end walls 23 formed integrally therewith and which cooperate with the units 22 and the plates C to define the chambers 12.

As shown in FIG. 4 of the drawings, the outer frame units 22 are suitably ported and provided with gas fittings 24 to conduct the gas G into and out of the chambers 12 of the cathode sections Z; the frame units 20 and 21 are suitably ported and are provided with suitable fluid conducting fittings 25 to conduct the ionolyte I into and out of the chambers 11 of the ion exchange sections Y; and the frame unit 22 is suitably ported and carries suitable fluid conducting fittings 26 to conduct the anolyte A into and out of the chamber 10 of the anode sections X.

In accordance with good and common practices, suitable sealing compounds and/or gaskets (not shown) are provided between the opposing abutting surfaces of the several elements and parts of the noted structure to maintain the assembled construction fluid tight.

Figures 5, 6, 7, 8:
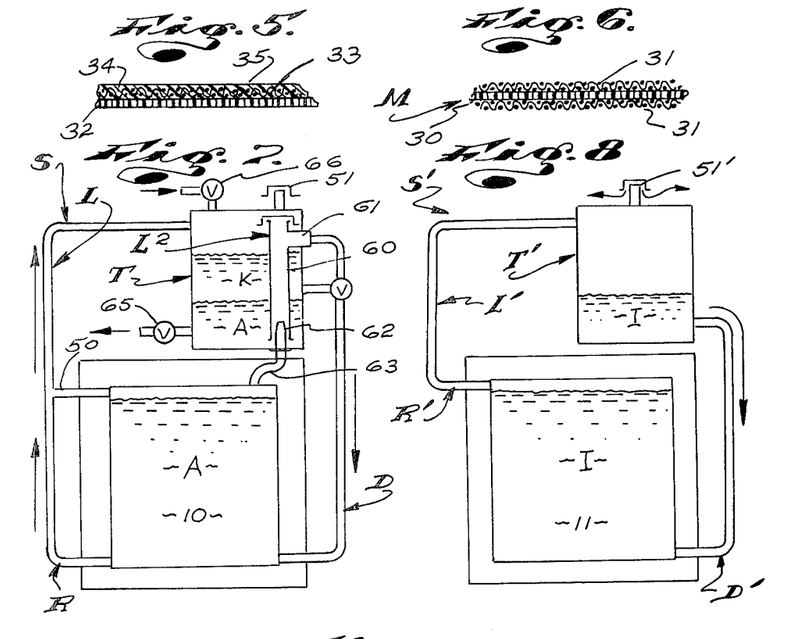
FIG. 5 is an enlarged sectional view of a portion of a cathode plate.
FIG. 6 is an enlarged sectional view of a portion of a cationic membrane.
FIGS. 7 and 8 are diagrammatic views of liquid handling means provided by the invention.

FIG. 6 is an enlarged cross-sectional view of a portion of one of the cationic membranes M. The membrane structure includes a flat sheet 30 of non-liquid permeable cationic material. In practice, the materials which are available to establish the sheet 30 are such that they require structural support in the environment in which they are used. Accordingly, as shown, the sheets 30 are sandwiched between a pair of strong and durable liquid permeable supporting laminates 31. In practice, the laminates 31 can be satisfactorily established of woven metal screen material.

Referring to FIG. 5 of the drawings, the cathode plates C are thin, flat, laminated assemblies including thin, longitudinally outer laminates 32 of hydrophobic sheet material, and intermediate current collector laminate 33 of course, woven metal or the like, and an inner laminate 34 of hydrophyllic material. In practice, and in the preferred carrying out of my invention, the inner hydrophyllic laminate 34 is established of a suitable filler material which is bonded to the inner surface of the laminate 32 and is packed within and establishes a matrix for the laminate 33 and defines a flat, longitudinally inwardly disposed wetting surface 35.

The sheet 30 of the membranes M and the laminates 32 and 34 of the cathode plates C can be established of any one of a number of different commercially available cationic, hydrophyllic and/or hydrophobic materials. Such materials, suitable for carrying out my invention, are attainable from most manufacturers and distributors of filter materials by specifying and ordering hydrophobic cationic sheet materials of appropriate weight, thickness and strength and which are otherwise chemically inert in the environment of fuel cells of the general class here concerned with.

It is to be noted that for effective operation and functioning of my new fuel cell, only one of the two illustrated and above noted ion exchange sections and one of the cathode sections need be provided. The provision of two sets of related ion exchange and cathode sections, related to a single anode section, is preferred since notable and apparent efficiencies are to be gained by such a combination and relationship of parts. Further, the noted sectional fabricated structure makes such a combination and relationship of parts both easy and economical to make, use and maintain.

It is to be further noted that any desired number of fuel cells B here provided can be connected in a battery of cells to obtain desired power output.

In furtherance of my invention, and to best describe the operation of my new fuel cell, those chemical reactions which take place in the anode section X, ion exchange sections Y, and cathode sections Z, will be given independent consideration. In this regard, cross-reference can be made to FIG. 1 and each of FIGS. 9 through 12 of the drawings for a better understanding of the invention.

Figure 9:
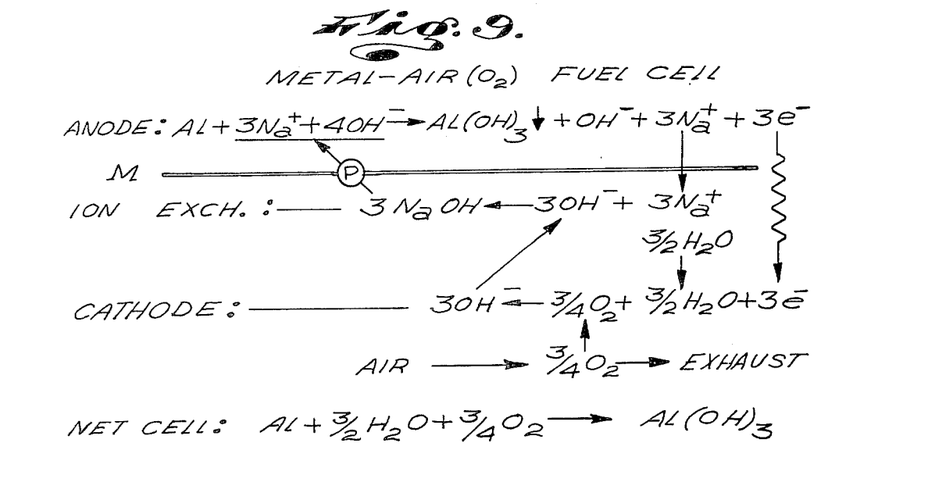
FIGS. 9 through 12 are formulas setting forth the chemical reactions which take place in my new cell when four different gases are used as cathode fuel.
Figure 10:
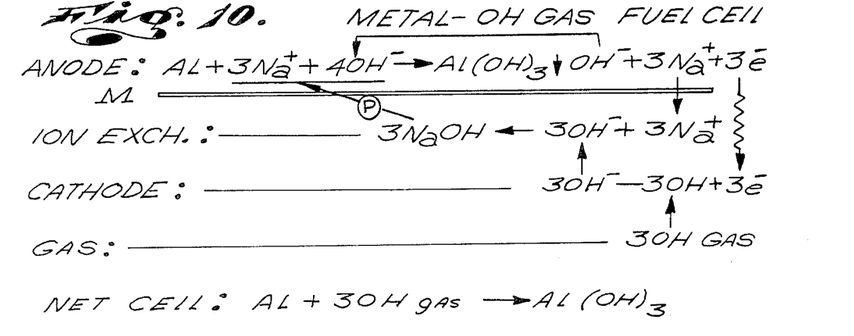
Figure 11:
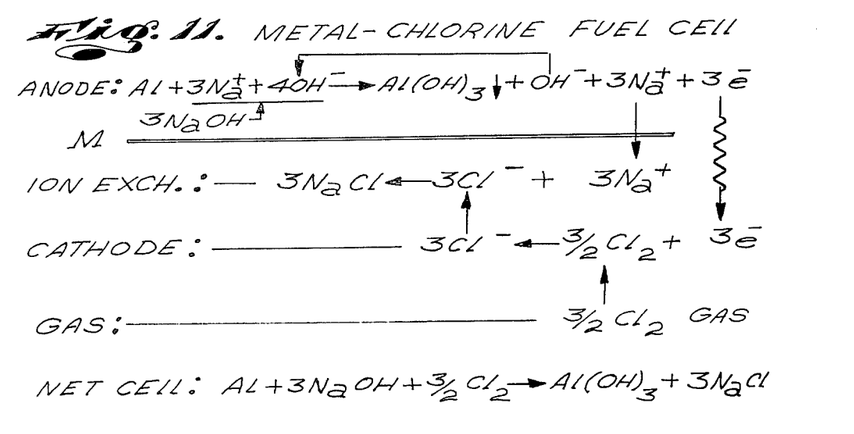
Figure 12:
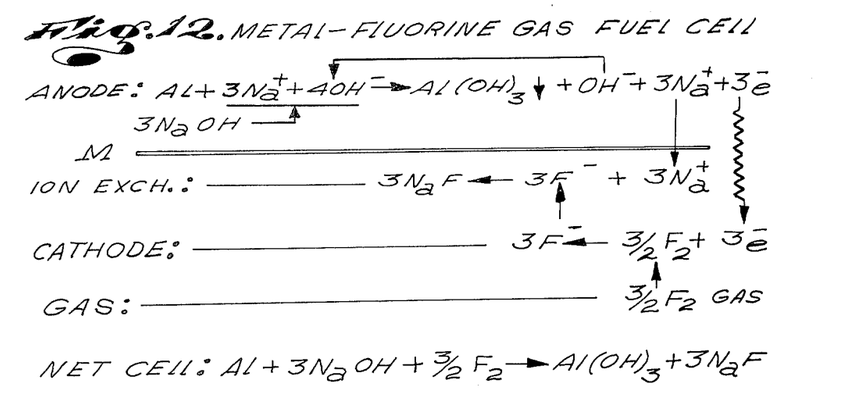

In accordance with the foregoing, considering the operation of the anode section X in that embodiment of the invention in which oxygen (from the air) is the gas used to fuel the cathode sections Z and the chemical formula of which is shown in FIG. 9 of the drawings, it is to be first noted that the anode plate Al is aluminum and the electrolyte or anolyte A is sodium hydroxide. Upon commencing fuel cell operation, the anolyte A is ionized and presents three positive sodium ions plus three negative hydroxyl ions. The positive charged sodium ions, due to an imbalance in each adjacent ion exchange section Y (to be later explained) move from the ion section X through the cationic membranes M separating the sections X and Y. Similar movement of the hydroxyl ions is blocked by the membranes M. As a result of the above, the remaining hydroxyl ions create an imbalance in the anode section and those ions are free to move and react with the aluminum. The reaction between the aluminum and hydroxyl ions results in the generating of the byproduct, aluminum hydroxide, plus a free hydroxyl ion, plus three free electrons. The byproduct, aluminum hydroxide, can be precipitated and is collected for disposal or salvage purposes. The single free hydroxyl ion is recycled and combined with the three hydroxyl ions supplied by the anolyte A. The three free electrons are conducted away, through the external circuit 16 to perform required work and are thence conducted to the cathode Z to establish and maintain that chemical reaction which takes place in the cathode sections Z. So long as the external circuit 16 is closed and the electrons flow, the above reaction will continue. It is only necessary that the supply of anolyte and aluminum be maintained and that the aluminum hydroxide be continually or periodically removed from the anode section X.

It is to be noted that in the above cell reaction, the aluminum hydroxide $(Al(OH)_3)$ is a common intermediate feed stock in the making of aluminum and is such that it can be easily and economically salvaged and processed to make aluminum for recycling in my fuel cell. Such salvaging and recycling of the noted byproduct makes operation of my new fuel cell highly efficient and economical.

To the best of my knowledge and belief, in prior art fuel cells in which aluminum is the anode fuel, the byproduct of fuel cell reaction is $NaAl(OH)_4$ and is such that to salvage it and reestablish aluminum fuel or recycling requires the addition of a crystalizer compound which reacts to reform it back to $NaOH + Al(OH)_3$ and the subsequent reforming of the $Al(OH)_3$ into aluminum, all of which is not economical or practical.

Next considering the chemical reaction in each ion exchange section Y of the cell, the ionolyte I is water with sodium hydroxide. The three positive charged sodium ions move from the anode section X into the ion exchange sections Y through the cationic membranes M and three hydroxyl ions from the air cathode sections Z are free to combine with the sodium ions therein to establish sodium hydroxide. As cell operation continues, the concentration of sodium hydroxide in the ionolyte I gradually increases and is such that when desired or when circumstances require, a portion of the ionolyte can be withdrawn and the remainder diluted by the addition of water. The ionolyte thus withdrawn can be disposed of but is preferably added to the anolyte for the cell section A, thus replenishing the supply of anolyte as operation of the fuel cell continues.

It will be apparent that so long as the cell is operating, sodium ions will continue to move from the anode section X to the ion exchange sections Y, hydroxyl ions will continue to move from the cathode sections Z to the ion exchange sections Y and that hydroxyl ions and sodium ions left to remain in the ion sections Y will continue to combine with the sodium ions to establish sodium hydroxide, in the manner set forth above. Unless and until the flow of electrons from the ion exchange sections Y to the cathode sections Z is stopped, can or will the chemical imbalance associated with the reactions in the cell sections X and Y be disturbed and chemical equilibrium in the cell sections X and Y be attained.

Next considering the chemical reaction in the cathode sections Z, that is, at or within the chambers 12 and cathode plates C, oxygen from the air is supplied at the outer surfaces of the cathode plates C and reacts with the electrons and water of the aqueous ionolyte I to form hydroxyl ions.

The cathode plates C, as noted above, are structures consisting of current collectors 33, outer hydrophobic laminates 32 and inner hydrophyllic laminates or layers 34. Accordingly, the oxygen may reach the inner electrolyte wetted surfaces 35 of the plates but the electrolyte will not pass completely through the cathode plate structures. The current collectors 33 which are chemically inert provide catalytic surfaces at which the cathodic reaction is reduced. The current collectors 33 can be established of layers of metal grids, expanded metal or metal screen and are packed or filled with the hydrophyllic material establishing the inner laminates or layers 34 of the plates.

As suggested above, it has been found that in practice, the inner laminates 34 of the plates C can be advantageously established of a catalyzed porous filler material applied to the inner surfaces of the laminates 32 and packed in and covering the current collector laminates 33.

In the above described fuel cell reaction, the cathode fuel is oxygen reduced from the air by the cathode plates C. In practice, the cathode plates C can effectively reduce certain other gases to effect and maintain efficient fuel cell reaction. Examples of other gases that can be used in my new fuel cell are oxygen-hydrogen, chlorine, fluorine, nitrogen and ozone. While the fuel cell reactions associated with the use of each of the above noted other gases is not identical with the reaction associated with oxygen or each of the other noted gases, the chemical reactions of each, in my new fuel cell, are similar in nature and are best described and understood by the fuel cell reaction produced when each is used. In accordance with the foregoing, in FIGS. 10, 11 and 12 of the drawings, the formulas of fuel cell reaction when oxygen-hydrogen, chlorine and fluorine are used, are set forth.

While anode or anode plate can be satisfactorily established of a considerable number of different metallic and/or metalloid elements, I prefer to use aluminum since it is inexpensive, is in abundant supply, is lightweight and is both easy and economical to work with.

Other metallic and metalloid elements suitable for use as anode fuel in carrying out my invention include beryllium, boron, lithium and magnesium, with or without suitable corrosion inhibitors such as chromium and gallium.

The electrolytes, that is the anolyte and ionolyte are base solutions which are preferably though not exclusively aqueous solutions of sodium hydroxide.

In the preferred carrying out of my invention, when the anode plate is aluminum, the corrosion reaction between the aluminum and the sodium hydroxide anolyte is great and such that excessive corrosion of the anode plate with resulting loss of efficiency of the cell will likely occur, if such corrosion is not suitably inhibited. To effectively inhibit excessive corrosion of the anode plate, I add chromic trioxide, $CrO_2$ (chromic acid) to adjust the PH thereof to from 10 to 14. By so adjusting of the anolyte, corrosion of the anode plate is inhibited and slowed to an extent that corrosion creates no significant problem. Further, such use of chromic acid has been found to establish a very stable and well balanced anolyte which assures effective and efficient operation of my fuel cell.

In furtherance of my invention, to start and stop operation of the cell and to maintain the cell in continuous effective and efficient operation, I provide a novel fluid supply means S for the anode section X. The system S includes a supply tank T containing an abundant supply of anolyte A and a supply of a suitable lightweight non-conductive or dielectric liquid, such as kerosene K. The kerosene or dielectric liquid K is lighter than the anolyte A and is such that it will not mix with the anolyte. Accordingly, the dielectric liquid K normally remains in the tank atop and separate from the supply of anolyte therein. (In practice, other dielectric liquids, such as mineral oil, might be used instead of kerosene). The tank T is connected with the lower portion of the chamber 10 of the anode section X of the cell by a delivery line D. The line D conducts the anolyte from the tank T into the chamber 10. The lower portion of the chamber 10 is also connected with the upper portion of the tank T by means of a return line R. The upper end of the line D is connected with a gas lift device $L^2$ within the tank T, the purpose of which will be described in the following. The return line R has a vertical gas lift portion L intermediate its ends and which occurs above the top of the chamber 10. The top of the chamber 10 is connected with the line R at the bottom of the gas lift portion L thereof by a gas line 50. The top of the tank T is provided with an upwardly extending gas vent 51. Finally, the means S includes a liquid flow line 52 connected with the central portion of the tank in which the dielectric liquid K normally occurs and with a manually operable valve V engaged in the line D. The valve V is operable to selectively conduct the anolyte A or the dielectric liquid K from the tank to the cell chamber 10 and is also operable to a closed position.

During normal operation of the fuel cell, the valve V is positioned to conduct anolyte from the tank T to the chamber 10. During operation of the cell, hydrogen gas generated by the reaction between the anode and anolyte rises to the top of the chamber 10 and out through the gas line 50 into the lower portion of the gas lift portion L of the return line R. The gas introduced into the line R operates to lift and cause anolyte in the line R to flow upwardly therein and thence back into the tank T. The gas separates from the anolyte in the top of the tank T and is vented to atmosphere through the vent 51. The noted flow of gas and anolyte in the return line R induces and maintains recirculation of anolyte through and between the tank T and the chamber 10. The anolyte delivered by the line R into the top of the tank, above the liquid K, drops down in the tank, through the liquid K to join the supply of anolyte in the tank. To attain the above noted operation of the means S, the tank T is preferably elevated above the chamber 10 a distance at which the gas moving up through the gas lift portion L of the line R causes the anolyte to recirculate at a suitable and desired rate. Accordingly, the vertical placement of the tank T, relative to the chamber 10, is largely dependent upon the rate and volume at which the motive gas is generated in the chamber 10, flows through the gas lift portion L, and is best determined and set by imperical procedures.

With the means S set forth above, when it is desired to put the cell out of operation, the valve V is operated to stop the flow of anolyte from the tank and to start the flow of the dielectric liquid K from the tank into the chamber 10. When the valve is thus operated, the continuing flow of anolyte from the chamber 10 into the tank T displaces the liquid K therein and causes it to flow into and fill the chamber 10, thus stopping fuel cell operation. When the chamber 10 is filled with the liquid K, the valve V is operated to its closed position to stop further movement of liquid.

When it is desired to restart operation of the cell, the valve V is operated to cause the anolyte to flow from the tank T into the chamber 10 and to thereby displace and move the lighter liquid K which occurs in the chamber 10 through the line R and back into the tank T, by specific gravity displacement.

The means S, shown and described above, has proven to be highly effective in operation and is believed to be particularly novel since it most effectively utilizes that gas which is generated in the chamber 10 to move and maintain the anolyte A in desired circulation.

Finally, in carrying out my invention, I provide novel fluid supply means S' for the ionolyte I. The means S' operates to maintain the supply of anolyte in the chambers 11 of the fuel cell in proper condition. The means S', like the means S, includes a tank T' in which an ample supply of ionolyte is maintained. The tank T' is connected with the lower portion of the chambers 11 by a delivery line D' and the top of the chambers 11 are connected with the upper portion of the tank T' by return lines R' (one is shown). Each return line R' has a vertical gas lift portion L' intermediate its ends. The tank T' is suitably vented as shown at 51'.

During operation of my fuel cell, the chambers 11 are filled with ionolyte I and fuel cell reaction generates sufficient gas (air) byproduct in the chambers 11 to establish and maintain recirculation of ionolyte through and between the chambers 11 and the tank T', as it moves up through the gas lift portion L' of the lines R'. Proper vertical positioning of the tank T' relative to the chambers 11, like the vertical positioning of the tank T, relative to the chamber 10, is necessary and is best determined and set by imperical procedures.

The system S', like the system S, has proven to be highly effective in operation and is novel in light of its efficient use of the byproduct gases of cell reaction in the anolyte sections of the fuel cell to induce and maintain desired flow of ionolyte through and between chambers 11 and the tank T'.

In practice, a plurality of the cells that I provide are connected to establish a battery of cells which will produce a desired amount of current. In such cases, it is desirable to have a single tank T to hold a single supply of anolyte for the plurality of cells making up the battery. The principal problem encountered in such a relationship of parts resides in the fact that shunt currents (hydroxyl ions) flow between the cells and the common supply of anolyte in the tank T, through the lines R and D. If not checked, such shunt currents will adversely affect and cut down the power output of the battery of cells.

In carrying out my invention, to prevent the flow of shunt currents through the return lines R and between the supply of anolyte in the tank T and the several cells, the lines R are established of dielectric material (plastic tubing) and the insulative gases introduced into and flowing upwardly in the gas lift portions L of the lines R effectively block the flow of shunt current in and through the anolyte within the lines R. Accordingly, in addition to moving anolyte, the gas lift portions of the return lines R serve to prevent the flow of current in and through those lines.

The gas lift device $L^2$ within the tank T and with which the delivery lines D for the several cells are connected serves the same shunt current blocking function as the gas lift portions L of the return lines R. The gas lift device $L^2$ can vary widely in details of construction and is shown as including a vertically extending gas lift tube 60 of dielectric material suitably mounted within the tank T with a lower open end within the supply of anolyte and an upper open end within the top of the tank above the liquid therein. A liquid outlet tube 61 connects with the upper portion of the tube 60 and extends to the exterior of the tank where it connects with the delivery lines D. The device $L^2$ finally includes a vertically directed gas jet 62 at the bottom of the tank T, directed up into the lower end portion of the tube 60 and the lower end of which is connected with the tops of the anode sections 10 of the cells by gas lines 63. It will be apparent that the portion of the gas generated in the sections 10 of the cells directed to the device $L^2$ and flowing upwardly therethrough effectively block the flow of shunt current while effectively maintaining desired flow of anolyte from the tank T to the several cells.

The tank T is shown provided with a valve controlled anolyte drain fitting 65 at its lower portion to effect draining or otherwise conducting anolyte from the tank and a valve controlled filler or return fitting 66 at its upper portion to facilitate adding or returning anolyte to the tank.

Figure 13:
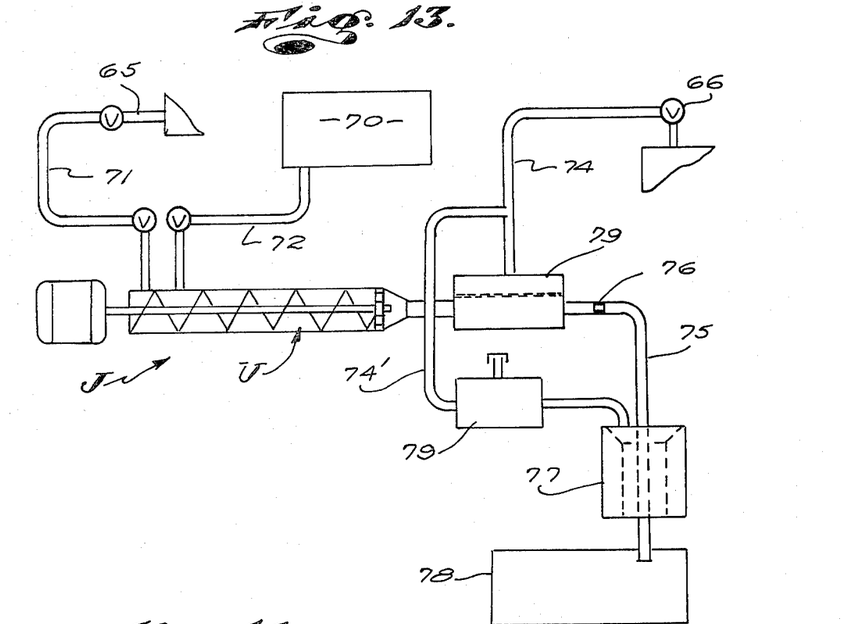
FIG. 13 is a diagrammatic view of another form of my invention.

In furtherance of my invention, and to effect salvage of the byproduct of the fuel cell reaction and to maintain a proper supply of anolyte in the tank T, I provide a novel anolyte treatment apparatus J which I have diagrammatically shown in FIG. 13 of the drawings.

The anolyte conducted from the cells into the tank T carries the byproduct of fuel cell reaction, aluminum hydroxide. The treatment apparatus J, shown in FIG. 13, is connected with and between the fittings 65 and 66 on the tank T to drain and conduct aluminum hydroxide ladened anolyte from the tank T, separate the aluminum hydroxide from the anolyte, return the aluminum hydroxide free anolyte to the tank, and reduce the aluminum hydroxide to aluminum oxide.

The apparatus J is shown as including a motor driven auger type mixing and material moving unit U into which anolyte from the tank T is conducted through a line 70, under control of a metering valve in the line 70. A precipitating solution ($C_4H_6O_4$) is conducted from a supply tank 71 through a line 72, under control of a metering valve in the line 72. The aluminum hydroxide ladened anolyte and precipitating solution are mixed in the unit U and the aluminum hydroxide is caused to precipitate therein and establish a jelly like solid. The anolyte and precipitate are advanced by and from the unit U into a filtering device 73 which separates the anolyte from the precipitate and returns it to the fitting 66 on the tank T through a line 74. The precipitate in the filter device is advanced from the device through a line 75 which can include a flow metering orifice 76. The line 75 conducts the precipitate into an electric muffle furnace 77 which operates to burn the precipitate at about 1200° centigrade, driving out of the precipitate all water vapor and $CO_2$ gas and reducing the precipitate to aluminum oxide. A suitable bin or container 78 is provided to receive the aluminum oxide from the furnace. The aluminum oxide can subsequently be used to make new aluminum anode plates. The water vapor and $CO_2$ gas are conducted from the furnace 77 into a condensor and gas separator 79. The gas in the separator 79 is vented to atmosphere and the water condensed therein is returned to the tank T through a line 74'.

Figure 14:
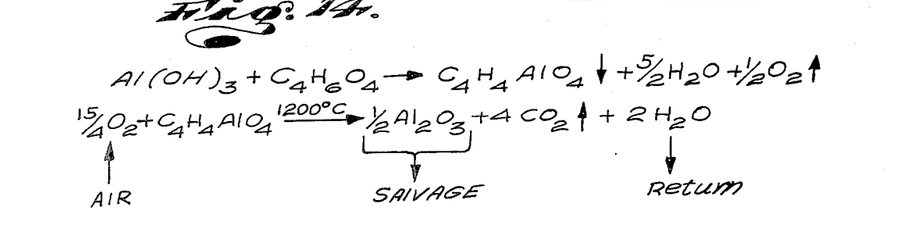
FIG. 14 is a formula.

The chemical reaction which takes place in the apparatus J described above is set forth in FIG. 14 of the drawings.

In considering the foregoing, it is to be noted that the aluminum is precipitated as dehydrated oxide $Al(OH)_3$ by means of an ammonia solution in the presence of an acid chelating compound. The aluminum hydroxide is amphoteric in character and precipitation commences at about 4 ph and is completed at from 6.5 to 7.5 ph. The ph is controlled by adding acid. The aluminum hydroxide is hygroscopic until its temperature is raised to about 1200° centigrade where it reduces to an oxide. For the foregoing reasons, the precipitate is ignited in a silica crucible in an electric muffle furnace at about 1200° centigrade.

As regards the chelating compound, 8-hydroxyquainoline forms normal chelating compounds with metals having the formula $(MC_9H_6NO)N$ in which n is the valence of the metal ion M. In the case of $Al(C_9H_6NO)_3$, the precipitated aluminum oxinate is salvaged. In accordance with the above, the precipitation solution may be made of hydrochloric acid, nitric acid, ammonium chloride, ammonium nitrate, ammonium benzonate, aniline, urea and most other ammonia compounds.

In the form of the invention described, the aluminum hydroxide is precipitated as a dense base succinate by an acid solution containing succinic acid with urea. It is easily filtered and has little tendency to absorb other salts. Upon ignition, it is readily reduced into alumia.

The above noted characteristics and features permit separation of the aluminum from large amounts of nickel and magnesium and from ferrous iron maintained in ferrous state by the addition of phenylhydrazine.

In practice, the treatment apparatus J need only be operated intermittently, as when the anolyte in the tank T commences to become oversaturated with the byproduct of fuel cell reaction. This can generally be determined by a drop in current output. Further, it has been determined that in large batteries, sufficient current is available to operate the apparatus J. Thus, a battery of cells with the system J related to it can be a self-contained apparatus or system which requires no external source of power.

Apart from periodically replacing reduced anode plates with fresh anode plates (which can be established from salvaged aluminum oxide), the periodic addition of small quantities of water and/or sodium hydroxide to the anolyte is all that is required to maintain the battery of cells that I provide in operation, for protracted periods of time.

In recent operation and testing of my invention, I have determined that the ammonia compounds added to the anolyte to cause the byproduct of fuel cell reaction to precipitate also function as excellent corrosion inhibitors in the anode sections of a battery of cells. It has also been determined that when an ammonia compound precipitating compound is added to the anolyte as a corrosion inhibitor and causes the byproduct of fuel cell reaction to commence to precipitate in the anode sections of the cells, anolyte caused to flow from the cells effectively carries the precipitate out of the cells.

In accordance with the above, the ammonia compound precipitant added to the anolyte in the apparatus J that I provide and which is carried by the anolyte back into the cells functions as a corrosion inhibitor and also causes the byproduct of fuel cell reaction to commence to precipitate in the cells. Therefore, the apparatus J need only be operated to add sufficient ammonia compound to replenish that compound which is spent during fuel cell operation. In practice, the ammonia compound could be introduced into the anode sections of the cell without departing from the broader aspects and spirit of the invention.

Having described only typical preferred forms and applications of my invention, I do not wish to be limited to the specific details herein set forth but wish to reserve to myself any modifications and/or variations that might appear to those skilled in the art and which fall within the scope of the following claims:

Having described my invention, I claim:

1. A metal gas fuel cell comprising:
   (a) an anode chamber, a base anolyte solution in the anode chamber and an anode plate of metallic fuel immersed in the anolyte;
   (b) an ion exchange chamber and a base ionolyte solution in the ion exchange chamber;
   (c) a cationic membrane between the anode and ion exchange chambers separating the anolyte and ionolyte and having opposite surfaces in contact with and wetted thereby;
   (d) a cathode plate adjacent the ion exchange chamber remote from the cationic membrane and having one surface contacting and wetted by the ionolyte and another surface in contact with a cathode fuel gas, said cathode plate is a layered structure including a layer of hydrophyllic material in contact with and wetted by the ionolyte, a layer of gas permeable hydrophobic material in contact with the gas and a gas and liquid permeable current collector of inert material with catalytic surfaces within the layer of hydrophyllic material;
   (e) an external electric circuit connected with the anode and cathode plates and conducting electrons from the anode plate to the cathode plate.

2. The metal gas fuel cell set forth in claim 1 which further includes a gas chamber adjacent the cathode plate into which the gas is conducted and which causes the gas to contact the cathode plate.

3. The metal gas fuel cell set forth in claim 1 which further includes anolyte supply means comprising a vertically extending anolyte supply tank, a supply of anolyte in the anolyte supply tank, a gas lift device in the tank with a liquid inlet in the anolyte in the tank, liquid and gas outlets in the tank above the liquid therein and a gas jet connected with the top of the anode chamber by a gas line, delivery line from the liquid outlet of the gas lift device to a lower portion of the anode chamber, a dielectric return line from the lower portion of the anode chamber to the upper portion of the anolyte supply tank, a vertically extending gas lift portion in the anolyte return line, a gas line connected with and between the top of the anode chamber to the lower end of said gas lift portion and conducting byproduct gas generated in the anode chamber into said gas lift portion, and gas vent means at the top of the tank.

4. The metal gas fuel cell set forth in claim 1 which further includes supply means comprising a vertically extending anolyte supply tank, a supply of anolyte in the anolyte supply tank, a supply of dielectric liquid which is lighter than and which will not mix with the anolyte normally within the anolyte supply tank atop the anolyte therein, a gas lift device in the tank with a liquid inlet in the anolyte in the tank, liquid and gas outlets in the tank above the liquids therein and a gas jet connected with the top of the anode chamber by a gas line, delivery line from the liquid outlet of the gas lift device to a lower portion of the anode chamber, a dielectric return line from the lower portion of the anode chamber to the upper portion of the anolyte supply tank, a vertically extending gas lift portion in the anolyte return line, a gas line connected with and between the top of the anode chamber to the lower end of said gas lift portion and conducting byproduct gas generated in the anode chamber into said gas lift portion, a valve in the anolyte delivery line, a liquid conducting line extending from said valve to the portion of the anolyte supply tank in which the dielectric liquid is normally contained, said valve is operable to selectively start and stop the flow of dielectric liquid and anolyte from the tank to the anode chamber and gas vent means at the top of the tank.

5. The metal gas fuel cell set forth in claim 1 which further includes ionolyte supply means comprising an ionolyte supply tank, a supply of ionolyte in the ionolyte supply tank, an ionolyte delivery line extending between and connecting the ionolyte supply tank with a lower portion of the ion exchange chamber, an ionolyte return line extending between the top of the ionolyte exchange chamber and the ionolyte supply tank and having a vertically extending gas lift portion intermediate its ends in which byproduct gas carried by the ionolyte in the ionolyte return line induces and maintains recirculation of ionolyte in the ionolyte return and delivery lines and through and between the ionolyte supply tank and ion exchange chamber and vent means to vent gas from the ionolyte supply tank.

6. The metal gas fuel cell set forth in claim 2 which further includes ionolyte supply means comprising an ionolyte supply tank, a supply of ionolyte in the ionolyte supply tank, an ionolyte delivery line extending between and connecting the ionolyte supply tank with a lower portion of the ion exchange chamber, an ionolyte return line extending between the top of the ionolyte exchange chamber and the ionolyte supply tank and having a vertically extending gas lift portion intermediate its ends in which byproduct gas carried by the ionolyte in the ionolyte return line induces and maintains recirculation of ionolyte in the ionolyte return and delivery lines and through and between the ionolyte supply tank and ion exchange chamber and vent means to vent gas from the ionolyte supply tank.

7. The metal gas fuel cell set forth in claim 3 which further includes ionolyte supply means comprising an ionolyte supply tank, a supply of ionolyte in the ionolyte supply tank, an ionolyte delivery line extending between and connecting the ionolyte supply tank with a lower portion of the ion exchange chamber, an ionolyte return line extending between the top of the ionolyte exchange chamber and the ionolyte supply tank and having a vertically extending gas lift portion intermediate its ends in which byproduct gas carried by the ionolyte in the ionolyte return line induces and maintains recirculation of ionolyte in the ionolyte return and delivery lines and through and between the ionolyte supply tank and ion exchange chamber and vent means to vent gas from the ionolyte supply tank.

8. The metal gas fuel cell set forth in claim 4 which further includes ionolyte supply means comprising an ionolyte supply tank, a supply of ionolyte in the ionolyte supply tank, an ionolyte delivery line extending between and connecting the ionolyte supply tank with a lower portion of the ion exchange chamber, an ionolyte return line extending between the top of the ionolyte exchange chamber and the ionolyte supply tank and having a vertically extending gas lift portion intermediate its ends in which byproduct gas carried by the ionolyte in the ionolyte return line induces and maintains recirculation of ionolyte in the ionolyte return and delivery lines and through and between the ionolyte supply tank and ion exchange chamber and vent means to vent gas from the ionolyte supply tank.

9. The metal gas fuel cell set forth in claim 1 wherein chromic acid is added to the anolyte solution to inhibit corrosion of the anode plate and the generating of gas which would adversely interfere with ion flow in the anode chamber.

10. The metal gas fuel cell set forth in claim 1 wherein the anode is aluminum and the byproduct of fuel cell reaction is aluminum hydroxide and is carried by the anolyte, said anolyte is caused to flow from the anode chamber and a precipitating compound is added to the anolyte to cause the aluminum hydroxide to precipitate therein, said precipitate is separated from the anolyte and the anolyte is caused to flow back into the anode chamber, the precipitate is ignited to drive gases and water vapor therefrom and to form aluminum oxide for producing new aluminum, said water vapor is condensed and returned to the anolyte.

11. A metal gas fuel cell comprising:
(a) a central anode chamber with opposite outer ends, a base anolyte solution in the anode chamber and an anode plate of metallic fuel immersed in the anode within the anode chamber;
(b) a pair of intermediate ion exchange chambers with inner and outer ends and each arranged with its inner end adjacent an outer end of the anode chamber, a base ionolyte solution in each ion exchange chamber;
(c) a cationic membrane between each ion exchange chamber and the anode chamber and having opposite surfaces in contact with and wetted by the anolyte and ionolyte;
(d) a cathode plate at the outer end of each ion exchange chamber and having an inner surface contacting and wetted by the ionolyte and an outer surface in contact with cathode fuel gas, each cathode plate includes an outer layer of gas permeable, hydrophobic material defining said outer surface thereof, an inner layer of hydrophyllic material defining said inner surface thereof and a gas and liquid permeable electron collector of inert material defining catolytic surfaces in contact relationship with the material of said inner layer; and
(e) an external electric circuit connected with the anode and cathode plates and conducting electrons from the anode plate to the cathode plates.

12. The metal gas fuel cell set forth in claim 11 which further includes gas chambers adjacent the outer surfaces of the cathode plates and which maintains gas in contact with the outer surfaces of the cathode plates.

13. The metal gas fuel cell set forth in claim 11 which further includes anolyte supply means comprising a vertically extending anolyte supply tank, a supply of anolyte in the anolyte supply tank, a gas lift device in the tank with a liquid inlet in the anolyte and liquid and gas outlets above liquid in the tank and a gas jet connected with the top of the anode chamber by a gas line, an anolyte delivery line from the liquid outlet of the gas lift device to a lower portion of the anode chamber, a dielectric return line from the lower portion of the anode chamber to the upper portion of the anolyte supply tank, a vertically extending gas lift portion in the anolyte return line, a gas line connected with and between the top of the anode chamber to the lower end of said gas lift portion and conducting byproduct gas generated in the anode chamber into said gas lift portion, and gas vent means above the gas lift portion of the return line.

14. The metal gas fuel cell set forth in claim 11 which further includes anolyte supply means comprising a vertically extending anolyte supply tank, a supply of anolyte in the anolyte supply tank, a supply of dielectric material which is lighter than and which will not mix with the anolyte normally within the anolyte supply tank atop the anolyte therein, a gas lift device in the tank with a liquid inlet in the anolyte and liquid and gas outlets above liquid in the tank and a gas jet connected with the top of the anode chamber by a gas line, an anolyte delivery line from the liquid outlet of the gas lift device to a lower portion of the anode chamber, a dielectric return line from the lower portion of the anode chamber to the upper portion of the anolyte supply tank, a vertically extending gas lift portion in the anolyte return line, a gas line connected with and between the top of the anode chamber to the lower end of said gas lift portion and conducting byproduct gas generated in the anode chamber into said gas lift portion, a valve in the anolyte delivery line, a dielectric liquid conducting line extending from said valve to the portion of the anolyte supply tank in which the dielectric liquid is normally contained, said valve is operable to selectively start and stop the flow of dielectric liquid and anolyte from the tank to the anode chamber and gas vent means above the gas lift portion of the return line.

15. The metal gas fuel cell set forth in claim 11 which further includes ionolyte supply means comprising an ionolyte supply tank, a supply of ionolyte solution in the ionolyte supply tank, an ionolyte deliver line extending between and connected with the ionolyte supply tank and the lower portion of the ion exchange chambers, an ionolyte return line extending between the top of the ionolyte exchange chambers and the ionolyte supply tank and having a vertically extending gas lift portion intermediate its ends and in which byproduct gases carried by the ionolyte cause the ionolyte in said gas lift portion to flow upwardly therein and to induce and maintain circulation of ionolyte in said ionolyte supply means and said ion exchange chambers.

16. The metal gas fuel cell set forth in claim 12 which further includes ionolyte supply means comprising an ionolyte supply tank, a supply of ionolyte solution in the ionolyte supply tank, an ionolyte deliver line extending between and connected with the ionolyte supply tank and the lower portion of the ion exchange chambers, an ionolyte return line extending between the top of the ionolyte exchange chambers and the ionolyte supply tank and having a vertically extending gas lift portion intermediate its ends and in which byproduct gases carried by the ionolyte cause the ionolyte in said gas lift portion to flow upwardly therein and to induce and maintain circulation of ionolyte in said ionolyte supply means and said ion exchange chambers.

17. The metal gas fuel cell set forth in claim 13 which further includes ionolyte supply means comprising an ionolyte supply tank, a supply of ionolyte solution in the ionolyte supply tank, an ionolyte delivery line extending between and connected with the ionolyte supply tank and the lower portion of the ion exchange chambers, an ionolyte return line extending between the top of the ionolyte exchange chambers and the ionolyte supply tank and having a vertically extending gas lift portion intermediate its ends and in which byproduct gases carried by the ionolyte cause the ionolyte in said gas lift portion to flow upwardly therein and to induce and maintain circulation of ionolyte in said ionolyte supply means and said ion exchange chambers.

18. The metal gas fuel cell set forth in claim 14 which further includes ionolyte supply means comprising an ionolyte supply tank, a supply of ionolyte solution in the ionolyte supply tank, an ionolyte delivery line extending between and connected with the ionolyte supply tank and the lower portion of the ion exchange chambers, an ionolyte return line extending between the top of the ionolyte exchange chambers and the ionolyte supply tank and having a vertically extending gas lift portion intermediate its ends and in which byproduct gases carried by the ionolyte cause the ionolyte in said gas lift portion to flow upwardly therein and to induce and maintain circulation of ionolyte in said ionolyte supply means and said ion exchange chambers.

19. The metal gas fuel cell set forth in claim 18 wherein the anode plate is aluminum and the byproduct of fuel cell reaction is aluminum hydroxide and is carried by the anolyte; said cell structure further includes a supply of liquid precipitating solution in a container, a mixing and material transporting device into which anolyte from the anode chamber and precipitating solution from the container are conducted, a filter device receiving aluminum hydroxide precipitate an anolyte from the mixing and transporting unit, means conducting anolyte from the filter device to the anode chamber, a furnace to receive and ignite the precipitate to drive water and gas therefrom and to reduce it to aluminum oxide, means conducting the precipitate from the filter device to the furnace, a condensor receiving gas and water vapor from the furnace and venting gas to the atmosphere, means conducting condensate from the condensor to the anode chamber and a receiver to receive aluminum oxide from the furnace.

20. The metal gas fuel cell set forth in claim 1 wherein the anode plate is aluminum and the byproduct of fuel cell reaction is aluminum hydroxide and is carried by the anolyte; said cell structure further includes a supply of liquid precipitating solution in a container, a mixing and material transporting device into which anolyte from the anode chamber and precipitating solution from the container are conducted, a filter device receiving aluminum hydroxide precipitate an anolyte from the mixing and transporting unit, means conducting anolyte from the filter device to the anode chamber, a furnace to receive and ignite the precipitate to drive water and gas therefrom and to reduce it to aluminum oxide, means conducting the precipitate from the filter device to the furnace, a condensor receiving gas and water vapor from the furnace and venting gas to the atmosphere, means conducting condensate from the condensor to the anode chamber and a receiver to receive aluminum oxide from the furnace.

21. The metal gas fuel cell set forth in claim 1 wherein the anode is aluminum and the byproduct of fuel cell reaction is aluminum hydroxide which is carried by the anolyte, a corrosion inhibiting and byproduct precipitating compound of ammonia is added to the anolyte to inhibit corrosion of the anode plate and cause the aluminum hydroxide to precipitate therefrom.

22. The metal gas fuel cell set forth in claim 11 wherein the anode is aluminum and the byproduct of fuel cell reaction is aluminum hydroxide which is carried by the anolyte, a corrosion inhibiting and byproduct precipitating compound of ammonia is added to the anolyte to inhibit corrosion of the anode plate and cause the aluminum hydroxide to precipitate therefrom.

* * * * *